Dec. 26, 1933.  W. F. PUNTE ET AL  1,941,052
DISPENSING CONTAINER
Filed March 25, 1933
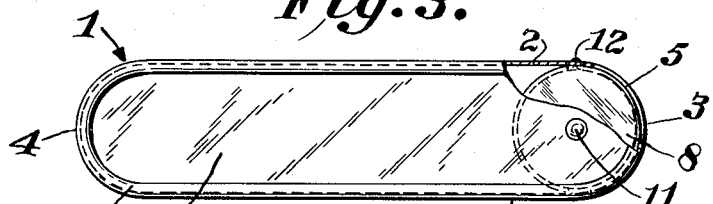
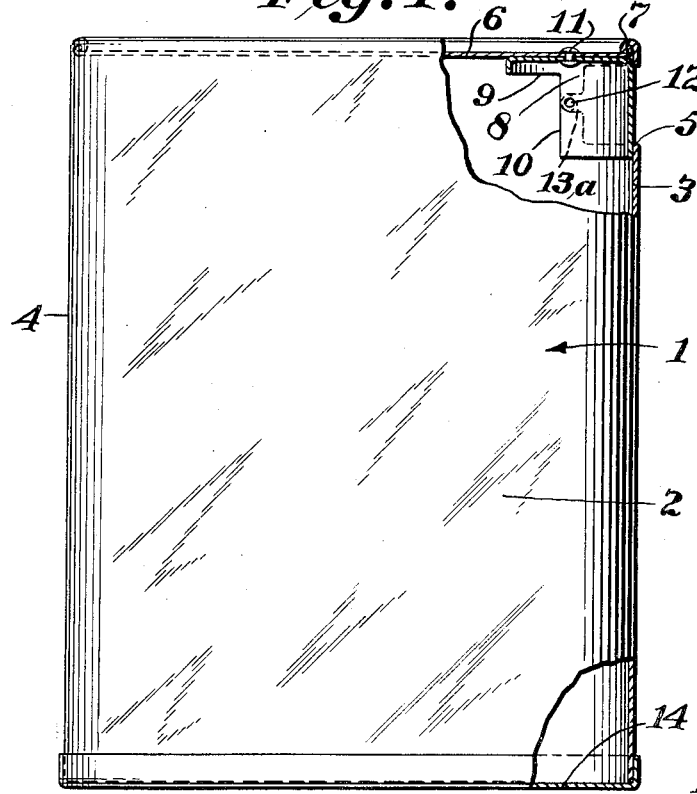
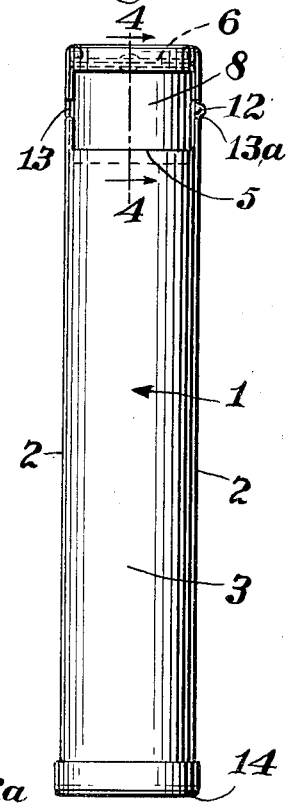
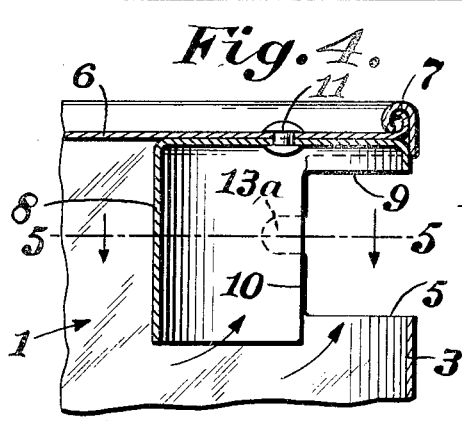
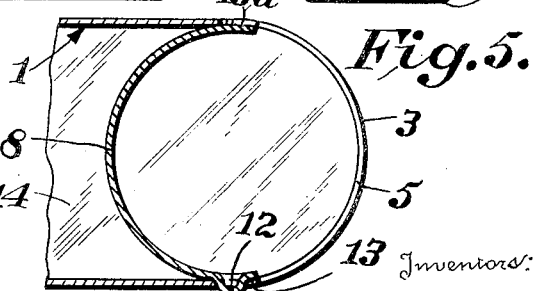
Inventors:
William F. Punte,
Charles J. Aulbach,
By Sturtevant Mason & Porter
Attorneys.

Patented Dec. 26, 1933

1,941,052

UNITED STATES PATENT OFFICE 1,941,052

DISPENSING CONTAINER

William F. Punte and Charles J. Aulbach, Syracuse, N. Y., assignors to Continental Can Company, Inc., New York, N. Y., a corporation of New York Application March 25, 1933. Serial No. 662,810

2 Claims. (Cl. 221—64)

The invention relates to new and useful improvements in a dispensing container and more particularly to a container constructed so as to dispense the contents thereof through the side wall of the container.

An object of the invention is to provide a container of the above type having an opening in the side wall thereof, with a cover member located within the container and contacting with the inner face of the wall of the container.

A further object of the invention is to provide a container of the above type, wherein the cover member is provided with a portion projecting outside of the container for ready engagement for moving the cover member.

In the drawing:

Figure 1 is a side view of a container with parts broken away to show the inner structure thereof.

Fig. 2 is an edge view of the container.

Fig. 3 is a plan view with parts broken away to show the cover member within the same.

Fig. 4 is a vertical sectional view on the line 4—4 of Fig. 2, but with the cover member shown opened.

Fig. 5 is a sectional view on the line 5—5 of Fig. 4.

The container is preferably of the type wherein the body portion has substantially parallel side walls with connecting circular end walls, thus producing a container which is of the general shape of an elliptical container. A closure end is seamed to the container body preferably by interrolling the metal parts. Adjacent this closure is an opening through which the contents of the container may be discharged. This opening is controlled by a cover member located within the container and contacting with the inner face of the circular end wall. Said cover member is in the form of an inverted cup pivoted to the closure end of the container centrally thereof and so that the outer face of the cover member makes contact with the inner face of the circular end member. The cup is cut away at one side thereof so that when the end member is in one position, the contents of the container may pass into the cover member and out through the opening in the container, while when said cover member is in another set position, the opening is completely closed.

Referring more in detail to the drawing, the body of the container is indicated at 1. Said body has substantially parallel side walls 2, 2 and end walls 3 and 4 which are circular in horizontal cross section. These side walls and end walls are integral. The usual side seam may be located in one of the end walls. In the other end wall there is an opening 5 which extends preferably substantially from the line where one flat side wall joins the end wall to the line where the other flat side wall joins the same. The body portion is closed by an end closure 6 which is secured to the body portion by interrolling the metal parts to form a seam, as indicated at 7.

The opening 5 is controlled by a cover member 8. This cover member 8 is in the form of an inverted cup, the skirt of which is cut along a horizontal line 9 and a vertical line 10, thus forming an opening in the skirt of the cup which is of the full dimensions of the opening 5. This cover member 8 is pivotally attached to the end member 6 at 11 and when so positioned, it makes contact with the inner face of the end wall 3. The cover member is curved to conform to this end wall. The skirt of the cover member is provided with a detent 12 which is adapted to register with a slot 13 in the side wall of the container.

In Fig. 5 of the drawing the cover member is shown as turned to open position. At this time the detent is in the slot 13. There is a similar slot 13ª in the other side wall of the container which receives this detent when the cover member is turned on its pivot so as to close the opening 5. The skirt extends beneath the opening 5 and overlaps the side walls of the opening 5 when it is in closed position. It will be readily seen that the operator, while holding the container in one hand, may place the thumb and finger against the detent 12, which extends out through the opening or slot receiving the same, so that it projects slightly beyond the outer face of the end wall. When this detent is engaged by the thumb or finger, the cover member may be readily shifted to open position or vice versa.

The other end of the body portion 1, is covered by a closure end 14 which may be secured thereto in any suitable way.

It is obvious that minor changes in the details of construction may be made without departing from the spirit of the invention as set forth in the appended claims.

Having fully described the invention, what we claim as new and desire to secure by Letters Patent is:

1. A container comprising a body portion having substantially parallel side walls and connecting circular end walls, a closure end secured to said body portion, said body wall having an opening therethrough adjacent said closure and a cover member located within said body portion and having its outer face shaped to conform to the inner face of the end wall of the container body, said cover member being pivoted to said end closure so that said cover member is maintained in contact with the inner face of the wall of the container body and said cover member being shaped so as to close said opening when in one position thereof and uncover the opening when in another position thereof.

2. A container comprising a body portion having substantially parallel side walls and connecting circular end walls, a closure end secured to said body portion, said body wall having an opening therethrough adjacent said closure and a cover member located within said body portion and having its outer face shaped to conform to the inner face of the end wall of the container body, said cover member being pivoted to said end closure so that said cover member is maintained in contact with the inner face of the wall of the container body and said cover member being shaped so as to close said opening when in one position thereof and uncover the opening when in another position thereof, said cover having a detent projecting outwardly and disposed so as to move into said opening and into slots at the side edges of the opening so that the opening may be completely uncovered when said covered member is in open position, said detent extending beyond the outer face of the cover so that it is readily engageable.

WILLIAM F. PUNTE.
CHARLES J. AULBACH.